(12) United States Patent
Kubota et al.

(10) Patent No.: US 6,483,789 B1
(45) Date of Patent: Nov. 19, 2002

(54) DATA RECORDING AND/OR REPRODUCING APPARATUS AND METHOD FOR DETECTING SECTOR DEFECTS

(75) Inventors: Yoshiyasu Kubota, Kanagawa (JP); Takayuki Sugawara, Fukushima (JP); Takahiro Kawauchi, Fukushima (JP)

(73) Assignees: Sony Corporation, Tokyo (JP); Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/470,355

(22) Filed: Dec. 22, 1999

(30) Foreign Application Priority Data

Dec. 24, 1998 (JP) .......................................... 10-367762

(51) Int. Cl.⁷ ................................................ G11B 5/09
(52) U.S. Cl. ...................................... 369/53.16; 360/51
(58) Field of Search .......................... 369/44.26, 47.14, 369/47.21, 47.27, 47.28, 47.31, 53.15, 53.16, 59.23, 124.07, 124.14; 360/51, 52, 46, 77.05, 78.14, 77.08

(56) References Cited

U.S. PATENT DOCUMENTS

| | | | | |
|---|---|---|---|---|
| 5,278,815 A | * | 1/1994 | Mashimo et al. | 369/47.21 |
| 5,706,265 A | * | 1/1998 | Bang | 360/73.03 |
| 5,864,531 A | * | 1/1999 | Horigome | 369/124.14 |
| 6,078,452 A | * | 6/2000 | Kittilson et al. | 360/31 |
| 6,104,560 A | * | 8/2000 | Tsunoda | 360/51 |
| 6,115,199 A | * | 9/2000 | Bang | 360/51 |
| 6,137,646 A | * | 10/2000 | Okamura et al. | 360/51 |
| 6,147,826 A | * | 11/2000 | Hashimura | 360/46 |
| 6,178,056 B1 | * | 1/2001 | Cloke et al. | 360/46 |

* cited by examiner

Primary Examiner—Thang V. Tran
(74) Attorney, Agent, or Firm—Frommer Lawrence & Haug LLP; William S. Frommer; Bruno Polito (57) ABSTRACT

A method for detecting a defective sector on a recording medium in a method for recording and/or reproducing data for the signal recording medium. A read gate is opened to reproduce data from a data field at a pre-set timing derived from a timing reference signal obtained on detecting a servo timing mark recorded in a servo field. If the timing reference signal has not been detected with success, the read gate is opened at a timing obtained based on a detection signal of a previously detected servo timing mark to reproduce the data from the data field. In detecting the defective sector, the state of deviation between the timing of opening the read gate and the data field is detected to detect the defective sector of the disc.

10 Claims, 6 Drawing Sheets

DATA RECORDING AND/OR REPRODUCING APPARATUS AND METHOD FOR DETECTING SECTOR DEFECTS

BACKGROUND OF THE INVENTION

1. Field of the Invention

This invention relates to a method and apparatus for recording and/or reproducing data for a signal recording medium.

2. Description of the Related Art

In a data recording and/or reproducing apparatus, employing a disc, there is known such disc in which a servo field is provided in a sector of a recording track of the disc, as exemplified by a hard disc. Recently, this technique is exploited in a flexible disc configured to accommodate the high density recording.

In a data recording and/or reproducing apparatus for recording and/or reproducing a flexible disc having a servo field, servo for seeking a target track for a magnetic head or servo for on-tracking is applied, or data is reproduced from a data field provided in association with a servo field, by signals recorded in the servo field.

In the servo field, there are recorded SYNC, servo timing marks (STM) and gray codes and servo information (A-burst, B-burst and so forth). The data recording and/or reproducing apparatus applies synchronization by SYNC and acquires recording/reproducing timing by servo timing marks. On the other hand, the data recording and/or reproducing apparatus recognizes the track positions on which is located the magnetic head, by the gray code, to correct the position of the magnetic head by the A-burst, B-burst etc.

In the data field, there are provided the SYNC and a data area. The data recording and/or reproducing apparatus applies synchronization by SYNC to read out data. Specifically, for data readout, a read-out gate of a read-out circuit is opened after lapse of a certain time, with the servo timing mark in the servo field as a reference, to read out data in a data area. That is, the read-out gate is opened so that the magnetic head is able to read from the SYNC of the data field to read-in data from a data area next following the SYNC.

It is noted that reflection of the results of inspection of the product quality after manufacture on a product after the inspection is crucial by reason of maintenance of data quality. For example, inspection of defective sectors of a disc to hold the defective sector position on the disc as the results of the inspection and reference to the results of the inspection to have data recorded and/or reproduced only on or from valid sectors represent effective means to prevent data recording and/or reproduction from becoming infeasible.

On the other hand, even in a disc decided to be free of defects by quality inspection, it is a frequent occurrence that sector errors be produced in an acquired fashion due to scratches on the disc surface, caused by repeated use, variations in the apparatus used for recording and/or reproduction, or to changes in the disc using environment, such as changes in temperature or humidity. For example, there are occasions wherein servo timing marks (STM) become unreadable due to scratches on the disc surface. If the servo marks become unreadable, the read gate becomes unopenable after lapse of certain time as from this servo timing mark as a reference, with the result that even normal data with only low inherent ECC error occurrence probability become unreadable.

Thus, it is thought to be desirable that data in the data field be made readable in case servo timing marks become unreadable in an acquired manner and that the read gate become unopenable after lapse of a certain time as from this servo timing mark as a reference such that even normal data with inherently low ECC error occurrence probability become unreadable.

Under the above-described circumstances, there is a demand for enabling data in the data field to be read in case the serving timing marks become unreadable in an acquired manner, and for having defective sectors supervised strictly at the time of manufacture. If the defective sectors can be made detectable by exploiting the functions in the apparatus, the apparatus can be exploited more efficiently.

SUMMARY OF THE INVENTION

It is therefore an object of the present invention to provide a data recording and/or reproducing apparatus in which, even on occurrence of readout droppings of the servo timing marks, next following normal data can be read, and in which defective sectors can be strictly supervised at the time of e.g., quality inspection.

In one aspect, the present invention provides a data recording and/or reproducing apparatus for recording and/or reproducing data for a recording medium having a sector including a servo area carrying servo signals used for servo and a data area provided in association with the servo area, including control means for opening a read gate at a first timing associated with a timing reference signal recorded in the servo area to reproduce data from the data area if the timing reference signal has been detected with success. The control means opens the read gate at a second timing associated with a timing reference signal detected from within a servo area of a previous sector to reproduce data from the data area if the timing reference signal has not been detected with success.

On detecting a defective sector, the control means opens the read gate at a third timing different from the second timing if the timing reference signal cannot be detected to detect the defective sector of the recording medium.

In another aspect, the present invention provides a data recording and/or reproducing apparatus for recording and/or reproducing data for a recording medium having a sector including a servo area carrying servo signals used for servo and a data area provided in association with the servo area, including control means for opening the read gate after lapse of a pre-set time duration after detection of a timing reference signal recorded in the servo area for reproducing data from the data area, if the timing reference signal has been detected with success. The control means outputs a pseudo timing reference signal based on a timing reference signal detected from within a servo area of the previous sector if the timing reference signal has not been detected with success. The control means opens the read gate after lapse of a second time duration after detection of the pseudo timing signal to reproduce data from the data area.

On detecting a defective sector, the control means outputs a pseudo timing signal based on a timing reference signal detected from within a servo area of a previous sector if the timing reference signal has not been detected with success. The control means opens the read gate after lapse of a third time interval after detection of the pseudo timing signal to reproduce the data from the data area.

In yet another aspect, the present invention provides a sector defect detection method for a recording medium having a sector including a servo area carrying servo signals used for servo and a data area provided in association with the servo area, including detecting a timing reference signal recorded in the servo area, outputting a pseudo timing reference signal, based on a timing reference signal detected from within the servo area of a previous sector, if the timing reference signal has not been detected with success, opening the read gate after lapse of a pre-set time after outputting of the pseudo timing signal to read out data from the data area, and decoding the read-out data to check a defect. The time which elapses since outputting of the pseudo timing signal until opening of the read gate is set so as to be longer than the time which elapses since the outputting of the pseudo timing signal in case of failure to detect the timing reference signal until opening of the read gate.

The data recording and/or reproducing apparatus according to the present invention includes a controller having a function for opening a read gate at a timing associated with a timing reference signal recorded in a servo area to reproduce data from the data area and for opening the read gate at a timing associated with the previously obtained timing reference signal to reproduce data from the data area if the timing reference signal has not been detected with success. When a defective sector is to be detected by the control means, the above-mentioned function is turned off to detect the defective sector. If the timing reference signal has not been detected, the function of opening the read gate at a timing associated with the previously detected tinning reference signal to reproduce the data from the data area to detect the defective sector of the recording medium.

Thus, for quality inspection, it is possible with the data recording and/or reproducing apparatus to detect the defective sector by having its function of reproducing data from the defective sector turned off Therefore, with the present data recording and/or reproducing apparatus, it is possible not only to record and/or reproduce data for the data area, but also to detect defective track, even if the servo timing mark cannot be read out.

DESCRIPTION OF THE PREFERRED EMBODIMENTS

Referring to the drawings, preferred embodiments of the present invention will be explained in detail. These embodiments represent the application of a data recording and/or reproducing apparatus according to the present invention to a magnetic disc device configured for recording and/or reproducing data for a flexible disc adapted for carrying out high density recording.

There are provided on a disc, data for which are recorded and/or reproduced by the present magnetic disc device, a servo field having signals usable for servo and a data field which is associated with the servo field.

Figure 1:
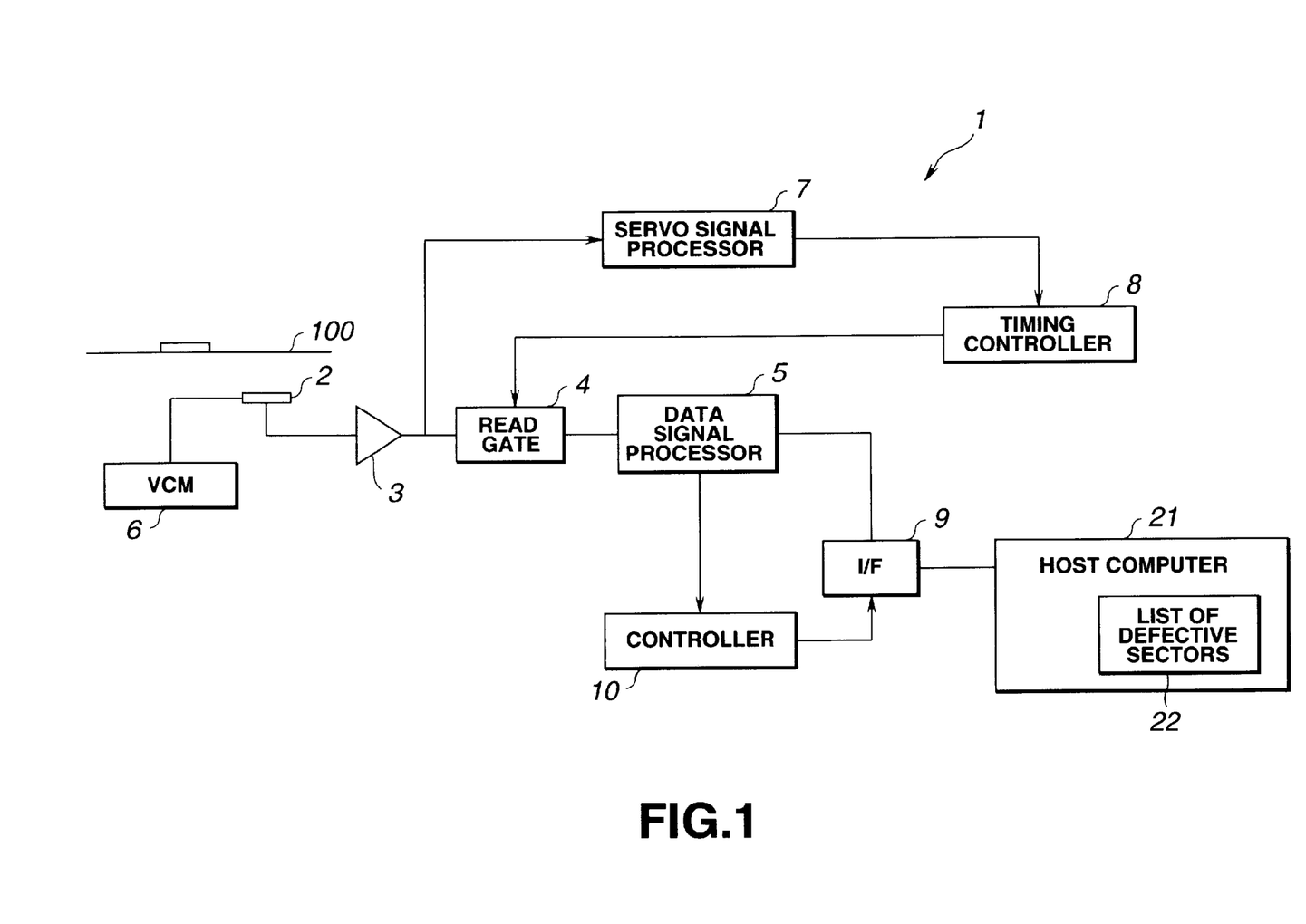
FIG. 1 is a block diagram showing the structure of a magnetic disc device embodying the present invention.

Referring to FIG. 1, a magnetic disc device 1 includes a magnetic head 2, an amplifier 3, a read-gate 4, a data signal processing unit 5, voice coil motor (VCM) 6, a servo signal processing unit 7, a timing controller 8, an interfacing (I/F) unit 9 and a controller 10. To the magnetic disc device 1 is connected a host computer 21 via an I/F unit 9.

In this magnetic disc device 1, the timing controller 8 performs control of opening the read-gate 4 for reproducing data from a data field at a pre-set timing derived from the timing reference signal obtained on detecting the servo timing mark recorded in the servo field, while performing control of opening the read-gate 4, at a timing obtained based on a detection signal of the servo timing mark detected in the previous sector, in case the timing reference signal cannot be detected, for reproducing data from the data field, by its function of reproducing data from the data field by opening the read-gate 4. For detecting a defective sector, the magnetic disc device 1 turns the above-mentioned function of the timing controller 8 off to detect the defective sector of the disc 100. The detection of the defective sectors by the magnetic disc 1 will be explained subsequently.

Figure 2:
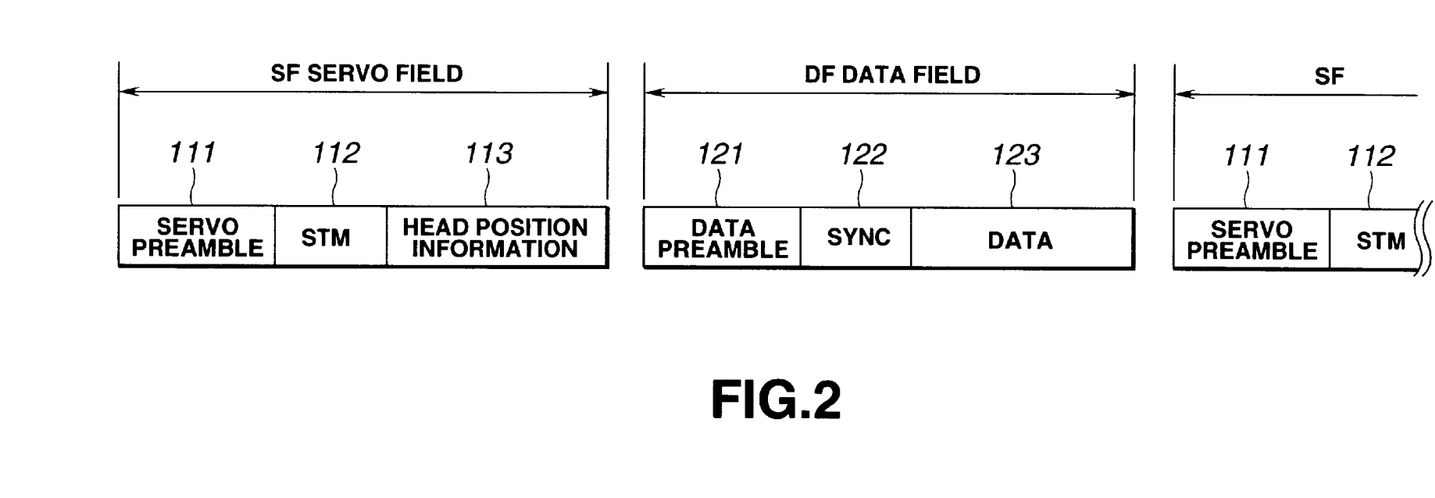
FIG. 2 shows the format of a disc data for which is recorded and/or reproduced by the magnetic disc device.

FIG. 2 shows a data format of a disc 100, data for which is recorded and/or reproduced by the magnetic disc device 1.

As shown in FIG. 2, the disc 100 has, a servo field SF and a data field DF from sector to sector.

The servo field SF is made up of a servo preamble 111, a servo timing mark (STM) 112 and the head position information 113. The servo preamble 111 is a synchronization signal for reading-in signals in the servo field SF, whilst the servo timing mark 112 is a signal for setting a timing in case of recording or reproducing data on or from the data field DF. The servo timing mark 112 is provided at a pre-set spacing from the data field DF. The magnetic disc device 1 opens the read-gate, as later explained, in a pre-set time as from detection of the servo timing mark 112, to read-in data 123 in the data field DF. The head position information 113 is the signal for correcting the position of the magnetic head 2. The head position information 113 is comprised of, for example, the track position information and tracking signals.

The data field DF is made up of a data preamble 121, a SYNC 122 and data 123. The data preamble 121 is a synchronization signal for reading-in signals within the data field DF. The SYNC 122 is a signal for synchronization to the data 123 recorded en suite.

The above is a data format of the disc 100. A specified example of the data format will be explained subsequently.

The magnetic disc device 1, configured for recording and reproducing data on or from the disc 100, having the above-described data format, is configured for writing and/or reading out signals on or from a recording surface of the disc 100 by the magnetic head 2.

The voice coil motor 6 drives the magnetic head 2 by a linear motor, not shown, along the radial direction of the disc 100.

The signals read-in by the magnetic head 2 from the disc 100 are inputted to the amplifier 3, where the signals read-in from the disc 100 are amplified. The signals amplified by the amplifier 3 are inputted to the servo signal processing unit 7 and to the read-gate 4. Specifically, as for the processing for reading-in data, the servo preamble 111, servo timing mark 112 and the head position information 113 are first read and subsequently the signal in the data field DF are read, so as to be amplified by an amplifier 3.

The servo signal processing unit 7 is responsible for processing signals for servo recorded in the servo field SF, whilst the read-gate 4 is responsible for reading-in the data 123 in the data field DF. This servo signal processing unit 7 performs processing for the servo timing marks recorded in the above-mentioned servo field SF.

Specifically, the servo signal processing unit 7 detects the servo timing mark 112 recorded on the disc 100 to output the detection signals to the downstream side timing controller 8. For reading-in the servo timing mark 112, a window for reading-in the servo signals is opened for a pre-set time duration. That is, the servo timing mark 112 from the amplifier 3 is detected by a window opened for a pre-set time duration by the servo signal processing unit 7, such that a corresponding detection signal is inputted to the timing controller 8. For example, the servo signal processing unit 7 counts by a counter to keep the window open for a pre-set time duration.

The timing controller 8 generates various control signals based on the results of processing of the servo signals by the servo signal processing unit 7. Specifically, the timing controller 8 outputs a read-gate control signal to the read-gate 4 based on a detection signal of the servo timing mark 112 by the servo signal processing unit 7.

The read-gate 4 opens the gate for signal inputting based on the read-gate control signal from the timing controller 8. This read-gate 4 is fed from the magnetic head 2 with an output signal, by which the data signal processing unit 5 decodes signals inputted during the time the read-gate 4 is open, that is the data 123 in the data DF. The data processed by the data signal processing unit 5 is inputted to the I/F unit 9 and to the controller 10.

The I/F unit 9 is an interface for transmitting signals from the data signal processing unit 5 and the controller 10 to a host computer 21 connected to the magnetic disc 1.

The controller 10 checks whether or not the data processed by the data signal processing unit 5 has been read-in without errors. The controller 10 outputs the results of decision to the host computer 21. The results of decision are transmitted via the I/F unit 9 to the host computer 21.

The host computer 21 performs variable processing on signals supplied via the I/F unit 9 from the magnetic disc device 1.

For example, if the data signal processing unit 5 has failed in recording or reproducing data or has received from the controller 10 a report to the effect that data recording or reproduction has not been made with success, the sector for which data has not been recorded or reproduced is recognized as a defective sector and is stored in e.g., a defective sector list 22. For example, the defective sector list 22 is made up of the information on the defective sectors on the disc and is written on the disc at the time of quality inspection following disc manufacture.

When data is recorded or reproduced on or from the disc, reference is had to this defective sector list 22 to have access only to normal sectors to record and/or reproduce the data.

When a disc is loaded on the above-described magnetic disc device 1, a maintenance area is read out first. In the maintenance area, there are recorded sector numbers of the defective sectors as the above-mentioned defective sector list. The magnetic disc device 1 performs corresponding processing based on the information on the defective sectors. That is, if a disc is loaded on the magnetic disc device, it reads out the maintenance area first to check whether a sector for which data is about to be recorded or reproduced is a normal sector or a defective sector. For example, the sector number of the defective sector read out from the maintenance area is stored in storage means, such as RAM, of the timing controller 8. As for the normal sector, data is recorded or reproduced by the processing sequence shown in FIG. 3.

However, for the sectors registered as defective sectors, data are usually not recorded nor reproduced. However, there are occasions wherein, even with a sector not registered as a defective sector, that is a sector verified to be normal at the time of quality inspection, sector errors are produced in an acquired fashion due to scratches on the disc surfaces, fluctuations in a recording and/or reproducing apparatus or to changes in the disc operating conditions, such as changes in temperature or humidity. For example, the servo timing marks may become unreadable due to scratches and so forth. Heretofore, if the servo timing marks become unreadable, even a sector registered as being a normal sector cannot be read by the read-gate becoming unopenable after a pre-set time referenced to the servo timing marks. With the magnetic disc device 1, data can be recorded and/or reproduced for the data field DF even in cases wherein the servo timing marks become unreadable.

Referring to FIG. 1 simultaneously, processing at the time of recording or reproducing data based on the defective sector list is explained.

The signals recorded on the disc 100 are read by the magnetic head 2 of the magnetic disc device 1. The read-out signals are inputted to the amplifier 3 where they are amplified.

In recording or reproducing data for the data field, the servo preamble 111 and the servo timing marks 112 are amplified by the amplifier 3.

Figures 3A, 3B:
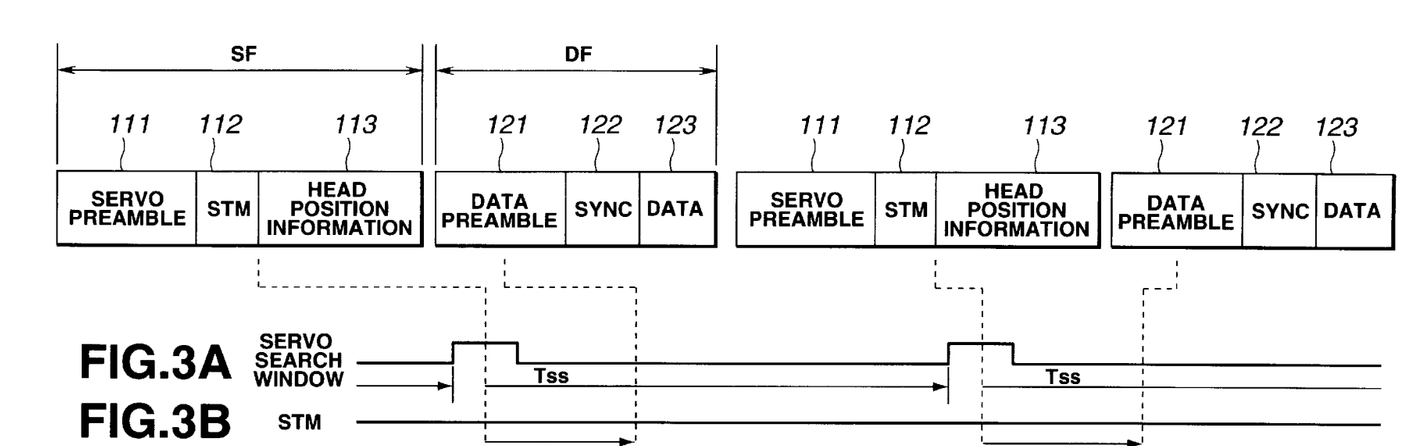
FIG. 3 shows the processing of the magnetic disc device at the time of reproducing data form a normal sector.

For the normal sector, the servo signal processing unit 7 opens the window, as shown in FIG. 3A, to detect the servo timing marks 112 outputted by the amplifier 3 next to the servo preamble 111.

It is noted that the window for detecting the servo timing marks is opened for a certain time duration, as shown in FIG. 3A, to wait for detection of the servo timing marks 112. By opening the window at a timing every pre-set time interval Tss, it becomes possible to detect the servo timing marks 112 recorded every pre-set time interval on the disc 100.

The window opening timing is set as follows: The servo signal processing unit 7 detects the servo timing marks 112 from the playback signals in the servo field SF to detect the end of the inputting of the servo timing marks 112, such as signal decay, as shown in FIGS. 3A and 3B. This detection is performed on the servo timing marks 112 sequentially inputted from the rotating disc 100 to acquire the reference timing, which reference timing is set as the timing of opening the window (time interval Tss).

For affording tune allowance to the window opening time, it becomes possible to detect the servo timing marks 112 in case the servo timing marks are inputted with a small time offset. The window may also be opened on detection of the servo timing marks.

The servo signal processing unit 7 detects the servo timing marks 112, by the window opened at this timing, to output a detection signal to the timing controller 8.

Figure 3C:
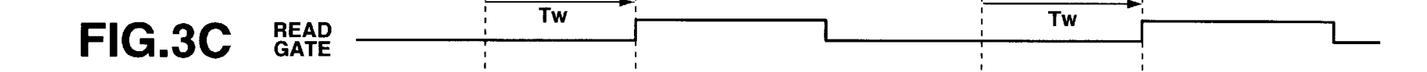

Based on the detection signal from the servo signal processing unit 7, as shown in FIGS. 3B and 3C, the timing controller 8 generates a read-gate control signal. The timing controller 8 outputs the read-gate control signal at a pre-set timing to the read-gate 4.

By the read-gate control signal, outputted at a pre-set timing from the timing controller 8, the read-gate 4 is opened for a pre-set time duration. For example, the read-gate 4 is opened after a pre-set time Tw as from detection of the servo timing marks STM, as shown in FIG. 3C. The timing of opening the read-gate 4 is set so as to be within the time duration of reproduction of the data preamble 121, as shown in FIG. 3C. On the other hand, the opening time of the read-gate 4 is set so as to be sufficient to read-in the SYNC 122 and data 123 inputted next to the data preamble 121.

By the opening of the read-gate 4, the data preamble 121, SYNC 122 and the data 123 of the data field DF, read-in by the magnetic head 2, are inputted to the data signal processing unit 5 via the read-gate 4.

The data signal processing unit 5 decodes the data 123, inputted next, with the timing set by the input SYNC 122 as reference.

Meanwhile, the servo timing mark 112, as a timing reference for issuing the read-gate control signal of opening the read-gate 4, is also used as other reference signal. For example, the magnetic disc device 1 causes movement of the magnetic head 2 to a desired sector by counting the detected servo timing mark 112 sequentially inputted from the rotating disc 100.

By the above processing, the magnetic disc device 1 records and reproduces data on or from the disc 100. The illustrative processing shown in FIG. 3 is the processing by the magnetic disc device 1 in recording or reproducing data for a normal sector. Referring now to FIG. 4, the processing of recording and reproducing data for the data field DF in case scratches which frustrate readout of the servo timing marks are produced in the course of repeated use is explained.

The magnetic disc device 1 starts reading out signals from the disc 100 by processing similar to that for the normal sector. That is, as discussed above with reference to FIGS. 3A and 3B, the magnetic disc device 1 acquires the reference timing marks from the servo timing mark 112 from the rotating disc 100 to set this reference timing as the timing of opening the window (time interval Tss).

Figure 4A:
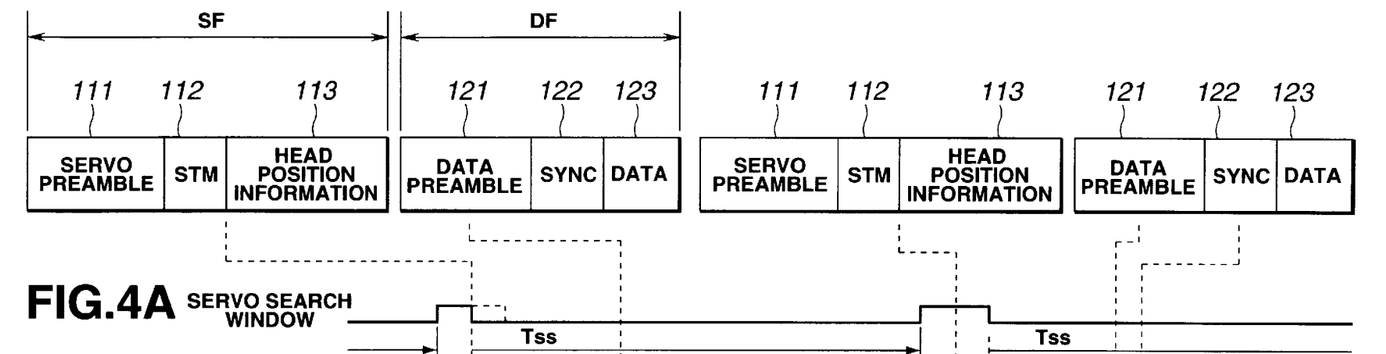
FIG. 4 shows the processing of the magnetic disc device at the time of reproducing data from a normal sector.
Figure 4B:
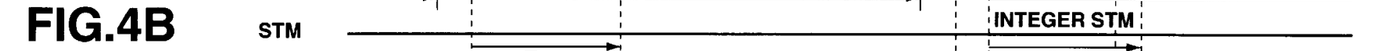

However, if, in case the servo timing mark 112 is unreadable, the servo timing marks cannot be detected even on opening the window at the pre-set time interval Tss, the servo signal processing unit 7 generates a pseudo-detection signal for the servo timing mark and outputs the generated pseudo-detection signal to the timing controller 8, as shown in FIG. 4B.

The timing controller 8 outputs the read-gate control signal to the read-gate 4 at a time interval Twc corrected with the input pseudo detection signal of the servo timing marks as a reference. This permits the data signal processing unit 5 to start readout of signals from the SYNC 122 to demodulate the data 123.

With the pseudo-detection signal for the servo timing marks being inputted to the timing controller 8, the latter outputs a read-gate control signal to the read-gate 4 at a pre-set timing to open the read-gate 4 by the read-gate control signal to permit the data of the data field DF to be fed to the data signal processing unit 5.

That is, if the servo timing mark 112 is unreadable, the timing controller 8 cannot detect the inputting of the servo timing mark 112 to the servo signal processing unit 7, so that no read-gate control signal can be produced, and hence data 123 of the data field DF is not fed to the data signal processing unit 5.

Thus, the magnetic disc device 1 generates the pseudo-detection signal for the servo timing mark in the servo signal processing unit 7 to enable the read-gate control signal to be issued by the timing controller 8. For example, the timing of generating the pseudo-detection signal is set to at least the window closing time, if the servo timing mark 112 is to be awaited as long as the window is opened, as shown in FIG. 4B.

Figure 4C:
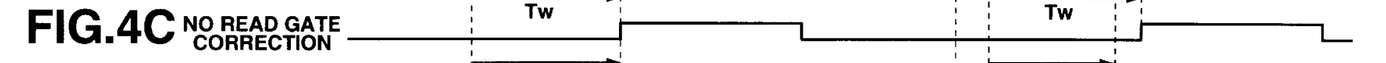
Figure 4D:
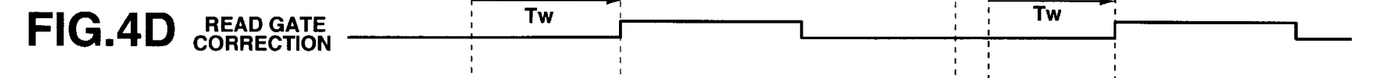

On the other hand, since the timing controller 8 generates the read-gate control signal, based on the servo timing mark detection signal from the servo signal processing unit 7. There is likely to be produced a situation in which, if the read-gate control signal is issued at a timing similar to that for a normal sector (pre-set time Tw) based on the pseudo-detection signal outputted with a delay as from detection timing of the normal sector by the servo signal processing unit 7, data cannot be demodulated in the data signal processing unit 5. For example, whilst it is necessary to read-in from the SYNC 122 in order to demodulate the data 123 recorded in the data field DF, data inputting is started partway during the SYNC 122, as shown in FIG. 4C, if the read-gate 4 is not opened at an optimum timing, such that the data 123 cannot be demodulated. That is, if simply a detection signal for the servo timing mark is generated in a pseudo-fashion, data recording or reproducing is not in operation as normally. Thus, if the pseudo-detection signal of the timing mark is issued, the timing controller 8 takes into account the signal delay and outputs the read-gate control signal at a pre-set time Twc corrected for the delay.

Thus, data can be recorded or reproduced as normally by generating the pseudo-detection signal and by outputting the read-gate control signal at the corrected pre-set timing Twc to the read-gate 4.

Meanwhile, the timing of issuing the pseudo-detection signal is not limited to the above configuration. Specifically, if the servo timing mark has not been detected whilst the window is open, the timing of issuing the pseudo-detection signal can be set depending on the relation between the time elapsed since the pre-set time Tss for window generation as described above until detection of non-detectability of servo timing mark and the distance traversed by the magnetic head 2 on detection of the non-detectability of servo timing mark.

The time until outputting of the read-gate control signal is corrected to the time since the window closing until opening of the read-gate 4, as measured previously at the time of reading-in the signals of the normal sector.

By the above processing, it becomes possible to record or reproduce data for the data field DF of the sector in which, even though no error has been caused in the data field DF, the servo timing marks cannot be read.

The turning-off of the function of reproducing data from the data field DF by the magnetic disc device 1 in case the servo timing marks as described above cannot be read, for example, the processing for detecting the defective sector which is effected by not correcting the above-mentioned pre-set time Tw, is hereinafter explained.

By setting the pre-set time Tw, without correcting the timing of opening the read-gate 4, the read-gate control signal is outputted from the timing controller 8, at a timing similar to that of the normal sector, by a detection signal of the pseudo-servo timing mark generated for the defective sector for which the servo timing mark cannot be read. However, if the read-gate 4 is opened at this timing, the data signal processing unit 5 is fed with a signal from a position offset from the normal position of the data field DF, so that data cannot be decoded.

The controller 10, monitoring the data decoding state in the data signal processing unit 5, outputs the result indicating whether or not data decoding has been performed as normally via the I/F unit 9 to the host computer 21.

The host computer 21 registers the sector that has not been decoded with success as a defective sector in the defective sector list 22.

By turning off the function of reproducing data from the defective sector of the magnetic disc 1, it becomes possible to detect the defective sector.

Figure 5:
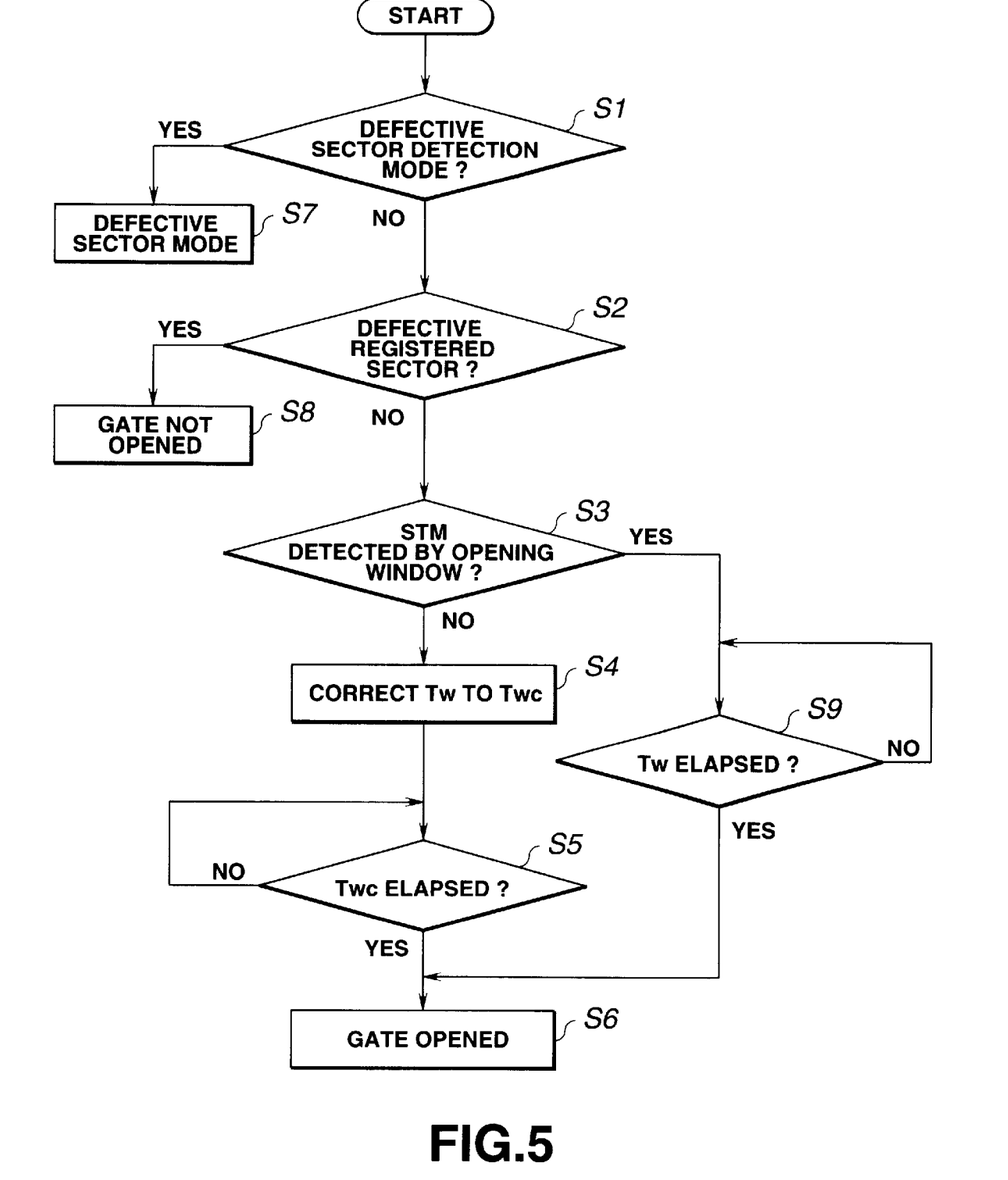
FIG. 5 is a flowchart showing a sequence of operations for an illustrative processing by the magnetic disc device.

FIG. 5 shows an illustrative processing step for recording and reproducing data as the defective sector is recognized and for transferring to the defective sector detection mode.

The magnetic disc device 1 checks at step S1 whether or not the current mode is the defective sector detecting mode. If the result of check is YES, the magnetic disc device 1 shifts to step S7 to execute the defective sector detection mode shown in FIG. 6. If otherwise, the magnetic disc device 1 shifts to step S2.

At step S2, the magnetic disc device 1 checks whether or not a sector about to be read is a defective sector, based on the information obtained from the maintenance area of the disc 100. If the result of check is YES, the magnetic disc device 1 shifts to step S8 to cause the gate not to be opened. If otherwise, the magnetic disc device 1 shifts to step S3.

If the magnetic disc device 1 at step S2 has confined that the sector about to be read has been registered as a defective sector, the magnetic disc device 1 shifts to step S8 to perform processing of not opening the gate. If otherwise, the magnetic disc device 1 moves to step S3.

If at step S2 the magnetic disc device 1 has confined that the sector about to be read has not been registered as a defective sector, the timing of preparing a window (time interval Tss) is determined based on the servo timing mark 112 from the servo field SF. The magnetic disc device 1 prepares the window at the determined timing to have access to the desired sector.

At step S3, the magnetic disc device 1 checks whether or not the servo timing mark (STM) of the desired sector has been detected with success during the time when the servo signal processing unit 7 opens the window. If the servo timing mark has been detected, the servo signal processing unit 7 outputs a detection signal of the servo timing mark to the timing controller 8. The magnetic disc device 1 then shifts to step Second film-shaped adhesive layer 9. If otherwise, the servo signal processing unit 7 outputs a pseudo detection signal from the servo signal processing unit 7 to the timing controller 8. The magnetic disc device 1 then moves to step S4.

At step Second film-shaped adhesive layer 9, the timing controller 8, fed with the servo timing mark detection signal, starts counting the pre-set time Tw. When the timing controller 8 has counted that the pre-set time Tw as from the inputting of the detection signal has elapsed, it outputs a read-gate control signal at step S6 to open the read-gate 4 for a pre-set time length. On opening the read-gate 4, the data 123 is decoded by the data signal processing unit 5.

At step S4, the magnetic disc device 1 corrects the time interval Tw as the output timing of the read-gate control signal to the time interval Twc. At step S5, the timing controller 8 is fed with the pseudo detection signal detecting the servo timing mark, to stat counting the pre-set time Twc. The timing controller 8 counts that the pre-set time Twc as from the inputting of the detection signal has elapsed to output the read-gate control signal at step S6 to open the read-gate 4 for a pre-set time. By this opening of the read-gate 4, the data 123 is decoded by the data signal processing unit 5.

Figure 6:
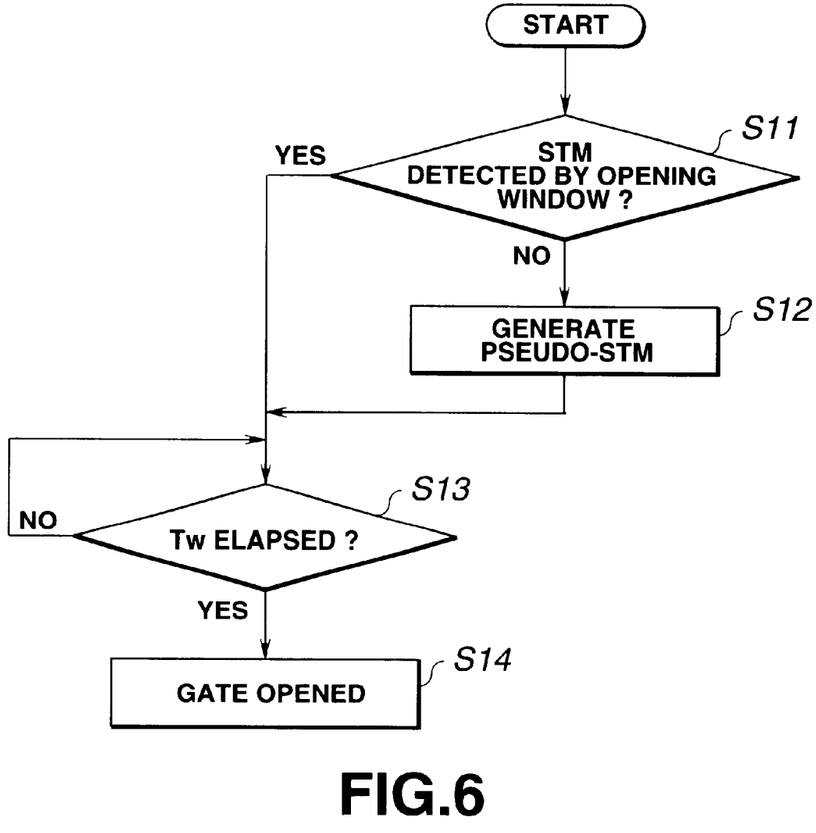
FIG. 6 is a flowchart showing a sequence of operations for an illustrative processing in the defective sector detection mode.

Referring to FIG. 6, the defective sector detection mode, to be carried out at step S7, is explained. For example, a maker manufacturing and selling out a disc is able to exploit this defective sector detection mode to register the defective sector on a disc at the outset.

First, at step S11, detection of the servo timing mark 112 is monitored from the playback signals from the servo field SF afforded from the servo signal processing unit 7 to the timing controller 8. That is, as the disc 100 is run in rotation and the read-out is monitored by the magnetic head 2, the servo timing mark 112 is monitored at a pre-set time interval.

If, at this step S11, the servo timing mark 112 is detected, the pre-set time Tw is started to be counted for a pre-set time duration as from the time of this detection. If, at step S13, the results of the counting indicate that the pre-set time Tw as from the detection of the servo timing mark 112 has elapsed, the magnetic disc device 1 shifts to step S14 to open the read-gate 4 for a certain time by the outputting of the read-gate control signal from the timing controller 8.

The result is that an output of the amplifier 3 is afforded to the data signal processing unit 5. The opening of the read-gate 4 after the lapse of the above-mentioned pre-set time Tw is set so as to occur in the course of reproduction of the data preamble 121 of the data field DF. Thus, an output of the data preamble 121 and the SYNC 122 are afforded to the data signal processing unit 5 so that the data signal processing unit 5 demodulates the ensuing data 123 with the timing as set by the SYNC 122 as a reference.

If the servo timing mark has not been detected with success during the time the window is kept opened, the magnetic disc device 1 advances from step S11 to step S12 to issue a pseudo detection signal of the servo timing mark at the timing of closing the window from the servo signal processing unit 7. By this pseudo detection signal, the pre-set time Tw starts to be counted. If, at step S13, the lapse of the pre-set time Tw as from the time of detection of the pre-set time Tw has been counted, the read-gate 4 is opened for a pre-set time duration by the outputting of the read-gate control signal from the timing controller 8.

By this opening, an output of the amplifier 3 is afforded to the data signal processing unit 5. However, since the pre-set time Tw has not been detected, the opening of the read-gate 4 is inputted as from a mid portion of the SYNC 122 of the data field DF, as an example, such that the data signal processing unit 5 is unable to decode the data 123.

By the processing shown in FIG. 6, the data signal processing unit 5 decodes the data field DF. The host computer 21, which has obtained the results of the decoding of the data signal processing unit 5 via the I/F unit 9, causes the sector, which has not been able to decode the data, to be registered as a defective sector in the defective sector list 22.

Meanwhile, it is also possible to verify before step S11 whether or not the sector about to be read has been registered as a defective sector. In this case, processing may be made so that, if the sector has been registered as a defective sector, the read-gate 4 is not opened and, if otherwise, the magnetic disc device 1 shifts to step S11.

Thus, the magnetic disc 1 is able record and reproduce data on or from the data field DF of the defective sector, while it is able to detect the defective sector by turning off the function of reproducing data from the defective sector.

Therefore, the magnetic disc device 1 operates as a device for inspection for shipment by simply turning off the function of reproducing data from the defective sector.

Also, the defective sector can be detected by an extremely simple configuration since it suffices to switch the mode. For example, if this control is to be made on the software, the defective sector can be detected only by changing the program or the like without the necessity of adding new circuitry.

Also, the processing operating based on detection of timing servo marks can be operated as normally by generating at least the pseudo servo timing mark detection signal to detect the defective sector. For example, it is possible with the magnetic disc device 1 to shift the magnetic head 2 to a desired sector by counting the pseudo servo timing mark detection signals as inherent servo timing marks.

Figure 7:
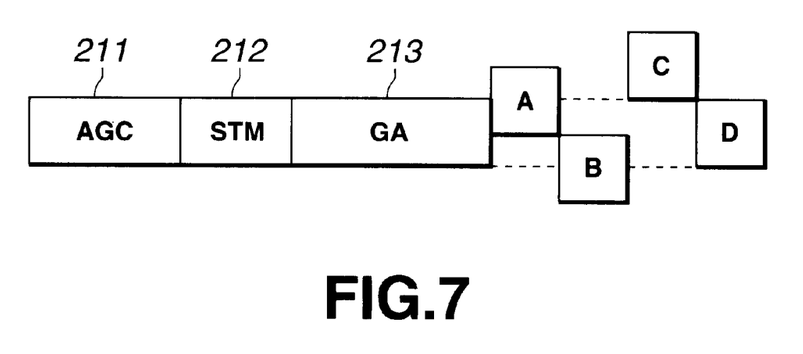
FIG. 7 shows an illustrative servo field for a disc.

FIG. 7 shows typical signals recorded in the servo field SF of the disc.

In the servo field SF, there are recorded the automatic gain control (AGC) signal 211, servo timing marks (STM), gray code areas (GA) 213 and burst patterns for tracking servo A, B, C and D.

The automatic gain control signals are recorded for controlling the signal playback level in the magnetic disc device 1. The servo timing marks 212 are made up of signals similar to the servo timing marks 112. The gray code areas 213 are those areas in which track numbers are recorded by the gray code in order to enable reproduction even under unstable tracking servo or in the absence of tracking servo.

The burst patterns A, B, C and D are pattern signals each of which is recorded with a sole frequency. The burst patterns A, B, C and D are formed at a pre-set width each at the track center axis. Thus, the burst pattern C (C-layer burst pattern) is formed so that its center is at the center axis of the odd-numbered track, whilst the burst pattern D (D-layer burst pattern) is formed so that its center is at the center axis of the even-numbered track. The burst pattern A (A-layer burst pattern) and the burst pattern B (B-layer burst pattern) are radially offset by one-half track pitch from the burst patterns C and D, respectively. These signals are detected and calculated to effect high-precision positioning with respect to the track center position.

What is claimed is:

1. A data recording and/or reproducing apparatus for recording and/or reproducing data for a recording medium having a sector including a servo area carrying servo signals used for servo and a data area provided in association with the servo area, comprising:

a read gate; and control means for opening said read gate at a first timing associated with a timing reference signal recorded in said servo area to reproduce data from said data area if said timing reference signal has been detected with success;

said control means opening the read gate at a second timing associated with a timing signal detected from within a servo area of a previous sector to reproduce data from said data area if said timing reference signal has not been detected with success;

said control means when detecting a defective sector opening said read gate at a third timing different from said second timing if said timing reference signal cannot be detected to detect the defective sector of the recording medium.

2. The data recording and/or reproducing apparatus according to claim 1 wherein
   said defective sector is detected based on the results of data recording and/or reproduction for said data area.

3. The data recording and/or reproducing apparatus according to claim 1 wherein
   said control means controls said second timing so that said second timing is shorter than said third timing.

4. The data recording and/or reproducing apparatus according to claim 1
   wherein said control means estimates a timing reference signal position of the current sector based on the previously detected timing signal, if the timing reference signal has not been detected, to output a pseudo timing reference signal, said control means opening said read gate after a pre-set time duration to reproduce data from said data area; and wherein
   if, when detecting said defective sector, said timing reference signal has not been detected, said control means estimates a timing reference signal position of the current sector, based on the previously detected timing reference signal, to output a pseudo timing reference signal, said control means causing said read gate to be opened after lapse of a time longer than said pre-set time to detect a defective sector of the recording medium.

5. The data recording and/or reproducing apparatus according to claim 1 further comprising:
   a servo signal processing unit for processing a servo signal; and
   a timing signal processing unit for controlling said read gate for recording and/or reproducing data based on the servo information from said servo signal processing unit.

6. A data recording and/or reproducing apparatus for recording and/or reproducing data for a recording medium having a sector including a servo area carrying servo signals used for servo and a data area provided in association with said servo area, comprising:

a read gate; and control means for opening said read gate after lapse of a pre-set time duration after detection of a timing reference signal recorded in said servo area for reproducing data from said data area, if said timing reference signal has been detected with success;

said control means outputting a pseudo timing reference signal based on a timing signal detected from within a servo area of a previous sector if said timing reference signal has not been detected with success, said control means opening the read gate after lapse of a second time duration after detection of said pseudo timing signal to reproduce data from said data area;

said control means when detecting a defective sector outputting a pseudo timing signal based on a timing reference signal detected from within a servo area of a previous sector if said timing reference signal has not been detected with success, said control means opening said read gate after lapse of a third time interval after detection of said pseudo timing signal to reproduce the data from the data area.

7. The data recording and/or reproducing apparatus according to claim 6 wherein
   said defective sector is detected based on the results of data recording and/or reproduction for said data area.

8. The data recording and/or reproducing apparatus according to claim 6 wherein
   said second time interval is set so as to be shorter than said first time interval.

9. The data recording and/or reproducing apparatus according to claim 6 wherein
said first time interval is set so as to be approximately equal to said third time interval.

10. A sector defect detection method for a recording medium having a sector including a servo area carrying servo signals used for servo and a data area provided in association with said servo area, comprising the steps of:

detecting a timing reference signal recorded in said servo area;

outputting a pseudo timing reference signal, based on a timing signal detected from within the servo area of a previous sector, if said timing reference signal has not been detected with success;

opening a read gate after lapse of a pre-set time after outputting of said pseudo timing signal to read out data from said data area; and decoding the read-out data to check a defect;

the time which elapses since outputting of said pseudo timing signal until opening of said read gate being set so as to be longer than the time which elapses since the outputting of said pseudo timing signal in case of failure to detect said timing reference signal until opening of said read gate.

* * * * *